United States Patent
Wurm et al.

(10) Patent No.: US 12,037,207 B2
(45) Date of Patent: Jul. 16, 2024

(54) METHOD AND ASSEMBLY UNIT FOR ASSEMBLING NON-ELECTRIC COMPONENTS ONTO A COMPONENT CARRIER

(71) Applicant: Siemens Aktiengesellschaft, Munich (DE)

(72) Inventors: Kai Wurm, Munich (DE); Philipp Sebastian Schmitt, Munich (DE); Werner Neubauer, Munich (DE); Dimitri Lomakin, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 182 days.

(21) Appl. No.: 17/500,153

(22) Filed: Oct. 13, 2021

(65) Prior Publication Data

US 2022/0127085 A1  Apr. 28, 2022

(30) Foreign Application Priority Data

Oct. 26, 2020 (EP) .................................... 20203916

(51) Int. Cl.
*B65G 47/91* (2006.01)
*B25J 9/16* (2006.01)

(52) U.S. Cl.
CPC .......... *B65G 47/917* (2013.01); *B25J 9/1676* (2013.01)

(58) Field of Classification Search
CPC ..... B65G 47/917; B25J 9/1676; B25J 9/1682; B25J 9/1602; B25J 9/1664; B25J 9/1669;
(Continued)

(56) References Cited

U.S. PATENT DOCUMENTS

| 4,890,241 A | 12/1989 | Hoffman et al. |
| 5,586,387 A | 12/1996 | Nakatani et al. |

(Continued)

FOREIGN PATENT DOCUMENTS

| CA | 3090364 A1 | 8/2019 |
| CH | 707625 A1 | 8/2014 |

(Continued)

OTHER PUBLICATIONS

Wojtynek et al., "Collaborative and Robot-Based Plug & Produce for Rapid Reconfiguration of Modular Production Systems", Dec. 11-14, 2017, IEEE, Proceedings of the 2017 IEEE/SICE International Symposium on System Integration, pp. 1067-1073 (Year: 2017).*

(Continued)

*Primary Examiner* — Khoi H Tran
*Assistant Examiner* — Nhi Q Bui
(74) *Attorney, Agent, or Firm* — Schmeiser, Olsen & Watts LLP

(57) ABSTRACT

A pick & place operation picking a non-electric component and placing the picked component onto a component-carrier and a connect operation connecting the placed component with the component-carrier by implementing a connection technology on a hybrid, at least reactive and deliberative machine architecture based on a "machine world model" as a digital twin to formulate correct machine-behavioral sets being used during machine run-time as well as an "machine workflow", and executing by machine motion generation including a collision-free motion or path planning of a machine within a machine workspace primary kinematic machine-movement-sequences enabling the pick & place operation and secondary kinematic machine-movement-sequences enabling the connect operation, and enabling the execution via the machine motion generation by initializing (Continued)

the "machine world model" according to a configuration file configuring the machine and the machine workspace and instantiating the "machine workflow" and updating the "machine world model" with a design of the component-carrier.

20 Claims, 4 Drawing Sheets

(58) Field of Classification Search
CPC ............ B25J 9/1687; G05B 19/41885; G05B 2219/40053; G05B 2219/45063; Y02P 90/02
See application file for complete search history.

(56) References Cited

U.S. PATENT DOCUMENTS

| | | | |
|---|---|---|---|
| 8,145,355 B2 * | 3/2012 | Danko | B25J 9/1607 700/262 |
| 9,969,084 B2 * | 5/2018 | Danko | E02F 9/2041 |
| 10,625,424 B2 * | 4/2020 | Langford | B25J 9/1687 |
| 2002/0165637 A1 | 11/2002 | Dillon | |
| 2009/0320271 A1 | 12/2009 | Perez Marin et al. | |
| 2014/0379129 A1 | 12/2014 | Edsinger et al. | |
| 2016/0001537 A1 | 1/2016 | De Rossi et al. | |
| 2016/0288281 A1 | 10/2016 | Kogushi | |
| 2018/0284786 A1 * | 10/2018 | Moshkina-Martinson | A47L 9/2831 |
| 2018/0349527 A1 * | 12/2018 | Li | G06N 3/08 |
| 2020/0156236 A1 | 5/2020 | Lager et al. | |
| 2020/0298411 A1 | 9/2020 | Feiten et al. | |
| 2020/0388997 A1 | 12/2020 | Bächler | |
| 2021/0041854 A1 | 2/2021 | Golway | |

FOREIGN PATENT DOCUMENTS

| | | | |
|---|---|---|---|
| CN | 1108985 | A | 9/1995 |
| CN | 102083567 | | 6/2011 |
| CN | 105324219 | A | 2/2016 |
| CN | 109153125 | A | 1/2019 |
| CN | 110561430 | A | 12/2019 |
| CN | 110561450 | A | 12/2019 |
| CN | 110636922 | A | 12/2019 |
| CN | 111315543 | A | 6/2020 |
| CN | 111515961 | A | 8/2020 |
| EP | 1537959 | A2 | 6/2005 |
| EP | 3075495 | A2 | 10/2016 |
| EP | 3376325 | A1 | 9/2018 |
| WO | WO-2006048756 | A1 * | 5/2006 ............ H02B 1/052 |

OTHER PUBLICATIONS https://de.wikipedia.org/wiki/Autonomer_mobiler_Roboter according to the version from Oct. 12, 2020.
https://en.wikipedia.org/wiki/Robotic_paradigm according to the version from Aug. 29, 2020.
European Extended Search Report for Application No. 20203916.0, dated Apr. 19, 2021.
Kheddar Abderrahmane et al.; "Humanoid Robots in Aircraft Manufacturing: The Airbus Use Cases"; IEEE Robotics & Automation Magazine; IEEE Service Center, Piscataway, NJ, US; vol. 26, No. 4; Dec. 1, 2019 (Dec. 1, 2019); pp. 30-45; XP011760161; ISSN: 1070-9932; DOI: 10.1109/MRA.2019.2943395.
Stasse Olivier et al.; "Talos: A new humanoid research platform targeted for industrial applications";; Mar. 8, 2017 (Mar. 8, 2017); XP093091418; Retrieved from the Internet: URL:https://hal.science/hal-01485519v1 /file/iros-talos.pdf.
Wojtynek Michael et al; Collaborative and Robot-Based Plug & Produce for Rapid Reconfiguration of Modular Production Systems.
Bolotnikova Anastasia et al:; "A circuit-breaker use-case operated by a humanoid in aircraft manufacturing"; 2017 13th IEEE Conference on Automation Science and Engineering (GASE); Aug. 1, 2017 (Aug. 1, 2017), pp. 15-22; XP093091405; DOI: 10.1109/COASE.2017.8256069; ISBN: 978-1-5090-6781-7; Retrieved from the Internet: URL:https://hal.science/hal-01565060v1/file/CASE17_0096_FI.pdf.
Giordano P.R. et al; "Robotic assembly of complex planar parts: An experimental evaluation", 2008 IEEE/RSJ International Conference on Intelligent Robots and Systems, Sep. 1, 2008 (Sep. 1, 2008), pp. 3775-3782; XP093091421; ISSN: 2153-0858; DOI: 10.1109/IROS.2008.4650984; ISBN: 978-1-4244-2057-5; Retrieved from the Internet: URL:https://ieeexplore.ieee.org/stampPDF/getPDF.jsp? tp=&arnumber=4650984&ref=.
Wu Zhi Min et al.; "Kinematic Simulation of SCARA Robot"; Guangdong University of Technology, Guangzhou 510006 , China, (C) 1994-2024 China Academic Journal Electronic Publishing House (in addition-marked up copy).
Zhang Ying Kun et al:; "Design and Study of Picking Manipulator for Chering Bottles"; DOI : 10 . 13462 / j . cnki . mmtamt . 2015 . 10 . 011; No. 10; Oct. 2015.

* cited by examiner

METHOD AND ASSEMBLY UNIT FOR ASSEMBLING NON-ELECTRIC COMPONENTS ONTO A COMPONENT CARRIER

CROSS-REFERENCE TO RELATED APPLICATIONS

This application claims priority to EP Application No. 20203916.0, having a filing date of Oct. 26, 2020, the entire contents of which are hereby incorporated by reference.

FIELD OF TECHNOLOGY

Embodiments of the invention refers to a method for assembling non-electric components onto a component-carrier and an assembly unit for assembling non-electric components onto a component-carrier.

BACKGROUND

Today, assembling non-electric components onto a component-carrier such as assembling DIN-rails and wiring ducts onto a back panel of a switch or control cabinet is partially automated. So, there exist machines that can cut and mark DIN-rails and wiring ducts and there are other machines to fit terminals to DIN-rails. However, the assembly of those non-electrical components being mounted onto the back panel of the switch cabinet or control cabinet is done manually.

The most common way of assembling non-electric components is to rivet the components respectively the wiring ducts and the DIN-rails onto the back panel thereby using blind rivets. The assembly steps are a) placing all DIN-rails onto the back panel,
b) riveting all DIN-rails to the back panel,
c) placing all wiring ducts onto the back panel, and
d) riveting all wiring ducts onto the back panel.

Most of the switch cabinets or control cabinets are custom made for each customer and lot sizes—in the sense of how many identical products are produced in one batch—can be as small as a single panel.

An aspect relates to propose a method and assembly unit for assembling non-electric components onto a component-carrier, by which assembling the non-electric components is automated.

SUMMARY

The main idea of embodiments of the invention in order to assemble a non-electric components onto a component-carrier is
(i) to carry out
  a pick & place operation picking the non-electric component and placing the picked non-electric component onto the component-carrier and
  a connect operation connecting the placed non-electric component with the component-carrier by implementing a connection technology
on a hybrid, at least reactive and deliberative machine architecture based on a "machine world model" as a digital twin to formulate correct machine-behavioral sets being used during machine run-time as well as an "machine workflow"—a piece of machine work to carry out the pick & place operation and the connect operation is passed in series of machine stages from initiation to completion,
(ii) to execute by machine motion generation including a collision-free motion or path planning of a machine within a machine workspace
  primary kinematic machine-movement-sequences enabling the pick & place operation and
  secondary kinematic machine-movement-sequences enabling the connect operation, and
(iii) to enable or ensure the execution via the machine motion generation by
  initializing the "machine world model" according to a configuration file configuring the machine and the machine workspace and
  instantiating the "machine workflow" and updating the "machine world model" with a design of the component-carrier.

A technical explanation, what "the hybrid, at least reactive and deliberative machine architecture" is about and what it meant by, is given in https://en.wikipedia.org/wiki/Robotic_paradigm according to the version from Aug. 29, 2020 and in https://de.wikipedia.org/wiki/Autonomer_mobiler_Roboter according to the version from Oct. 12, 2020.

The advantage of the idea solving the addressed problem and summarized above lies in the reduction of setup costs per assembly. This cost will be mainly driven by the cost of generating a digital model of the component-carrier, e.g. back panel, design. Since such models are already used today, for manual assembly, the cost of setting up an automated assembly unit will be close to zero using the idea.

For this reason, this solution enables the automated assembly unit of lot-size-one orders at an economic price.

One key aspect of the idea is the machine motion generation with the collision-free motion or path planning of the machine within the machine workspace executing—as two kinematic chains—the primary kinematic machine-movement-sequences enabling the pick & place operation and the secondary kinematic machine-movement-sequences enabling the connect operation performing for instance the back panel assembly.

The machine motion generation approach on the one hand prevents unintended collision of the machine, e.g. the robot or the two robots. On the other hand, it generates intentional contacts to assemble the cite non-electric components onto the component-carrier, e.g. the back panel. The machine motion generation is robust to expected disturbances and tolerances.

Implementing the cited idea—the automation of the non-electric component, e.g. a DIN-rail and a wiring duct, assembly onto the component-carrier, e.g. a back panel of a switch cabinet or control cabinet—leads to a flexible assembly unit including a machine and a machine control working together technically and functionally and being designed such that the unit interprets the product description and then executes all assembling steps without detailed programming.

The machine, on which the primary kinematic machine-movement-sequences and the secondary kinematic machine-movement-sequences are executed, is a single robot, a single gantry, a single delta picker etc. or includes two robots, two gantries, two delta pickers etc., wherein on one the primary kinematic machine-movement-sequences and on the other the secondary kinematic machine-movement-sequences are executed.

Further advantageous or beneficial developments of embodiments of the invention to make the automated assembly of a non-electric component onto the component-carrier more effective the execution of the primary kinematic machine-movement-sequences and the secondary kinematic machine-movement-sequences is carried out such that those sequences of the primary kinematic machine-movement-sequences responsible for placing the picked non-electric component onto the component-carrier are executed with force feedback to place the picked non-electric component.

This force feedback could be used advantageously and in particular when at least one other non-electric component is already placed on the component-carrier and is adjacent to the picked non-electric component to be placed.

Besides the feedback scenario, additionally or alternatively also to make the automated assembly of a non-electric component onto the component-carrier more effective the execution of the primary kinematic machine-movement-sequences and the secondary kinematic machine-movement-sequences is carried out such that those sequences of the secondary kinematic machine-movement-sequences responsible for connecting the placed non-electric component with the component-carrier, when due to an ill-fitting between the picked and placed non-electric component to be connected and the component-carrier the connection technology, which is preferably based on riveting or screwing, cannot be implemented, are executed with an expanding pendulum motion for a fitting-finding to implement the connection technology.

Moreover and beyond of all of that it is advantageous or beneficial to have an intentional contact between the non-electric component and the component-carrier enabled by the machine motion generation or by the machine motion generation executing the primary kinematic machine-movement-sequences and the secondary kinematic machine-movement-sequences and to make the automated assembly of the non-electric component onto the component-carrier ensured.

The assembly unit is a machine, e.g. a single robot or a pair of robots, including its control software, e.g. the machine control, to automate the assembly of the non-electrical component, e.g. the wiring duct, the DIN-rail, etc., onto the component-carrier, e.g. the back panel of the switch cabinet or control cabinet.

The machine consists preferably—as already stated above—of two kinematic chains, where each is called accordingly as a robot, and could be a robot arm, gantry, delta picker, or any other suitable kinematic.

One robot places the components onto the back panel. It is equipped with a tool to pick and place wiring ducts and DIN-rails, such tools include grippers and suction grippers. The second robot assembles the components to the back plane by placing blind rivets through holes in the components and matching holes in the back panel.

One key sub-unit of the assembly unit is the control software respectively the machine control. The control software respectively the machine control contains an internal model of the machine and its environment, the so-called "machine world model". This model is initialized from the machine configuration file that includes all collision bodies, their relation to each other, and a description of all kinematic elements of the machine.

The control software respectively the machine control also contains a description of the machine behavior inter alia given or described by the "machine workflow" which is instantiated by the configuration of the component-carrier, e.g. the back panel, as a product. In general, this "machine workflow" is the same for all carrier-components or back panels. The machine first picks the non-electric component from a known position in its workspace, which could be a magazine, a conveyor belt, an "Automated Guided Vehicle <AGV>", etc. Then it interprets the product description of the carrier-component or back panel, e.g. a CAD drawing, to place the non-electric component, e.g. the DIN-rail or wiring duct, onto the carrier-component or back panel. But each carrier-component or back panel may contain a different number of non-electric components, other non-electric components and they may be placed at different locations. Therefore, the "machine workflow" is adapted to the specific product configuration.

The machine motions are not pre-programmed but are computed based on the "machine world model". The motion generation component ensures that all motions are collision-free: motion planning algorithms are used to compute motions that do not collide unintentionally with parts of the machine, the surrounding, obstacles, the back panel, or components of the back panel.

To assemble non-electric components onto the component-carrier, the machine motion generation also generates intentional contact between the non-electric component and the component-carrier. Different motions are generated, e.g. according to the use-case of a pair of robots, for the one robot that places the non-electric component onto the component-carrier and for the other robot carrying put the connection technology, e.g. inserting the rivets.

To place a new non-electric component, e.g. the DIN-rail and/or the wiring duct, onto the component-carrier, e.g. the back panel, the following placing algorithm is used.

If there are no other, non-electric components already placed and riveted on the back panel, which are adjacent to the new non-electric component (the non-electric component to be placed), the new non-electric component is placed in an orthogonal movement straight down onto the back panel until a given force is applied.

However, if there are already other, adjacent, non-electric components on the back panel and if they constrain the placing motion, the new non-electric component is placed on a free location on the back panel and then slit to the right location, against the other, adjacent, non-electric component, until a given force is applied.

If the new non-electric component is constrained by two other, adjacent, non-electric components then the new non-electric component is placed down at an angle to the back panel and slit towards one of the other, adjacent, non-electric components until a given force is applied and only then the new non-electric component is placed down flat on the back panel.

To connect the new non-electric component, e.g. the DIN-rail and/or the wiring duct, onto the component-carrier, e.g. the back panel, the connection technology is used, which is based preferably on riveting or screwing. Thus, to rivet the new non-electric component, e.g. the DIN-rail and/or the wiring duct, onto the component-carrier, e.g. the back panel, rivets are placed through holes in the new non-electric component and through corresponding holes in the component-carrier. The locations of these holes are specified in the design of the component-carrier. Because of tolerances in the non-electric components, the component-carrier and the placing of the non-electric components, the holes in the non-electric components and the holes in the component-carrier do not always line up.

Thus, if the "riveting robot" is unable to insert the rivet at the specified location, motions are generated that move the rivet in an expanding pendulum motion until the rivet is placed through the non-electric component and through the component-carrier.

BRIEF DESCRIPTION

Some of the embodiments will be described in detail, with reference to the following figures, wherein like designations denote like members, wherein.

DETAILED DESCRIPTION

Figure 1:
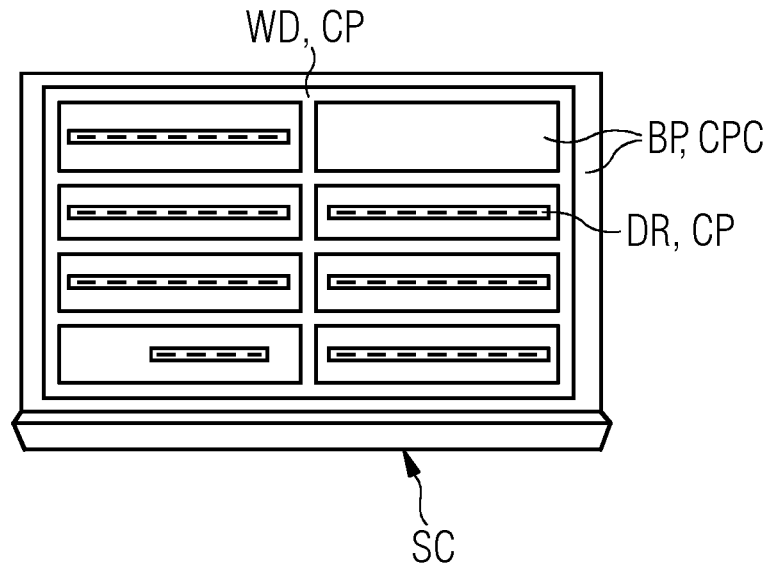
FIG. 1 shows an assembled back panel of a switch panel or control panel.

FIG. 1 shows an assembled back panel BP of a switch panel or control panel SC. On this back panel BP there are assembled wiring ducts WD and DIN-rails DR. Generally speaking, these assembled objects are non-electric components CP being assembled onto a component-carrier CPC.

Figure 2:
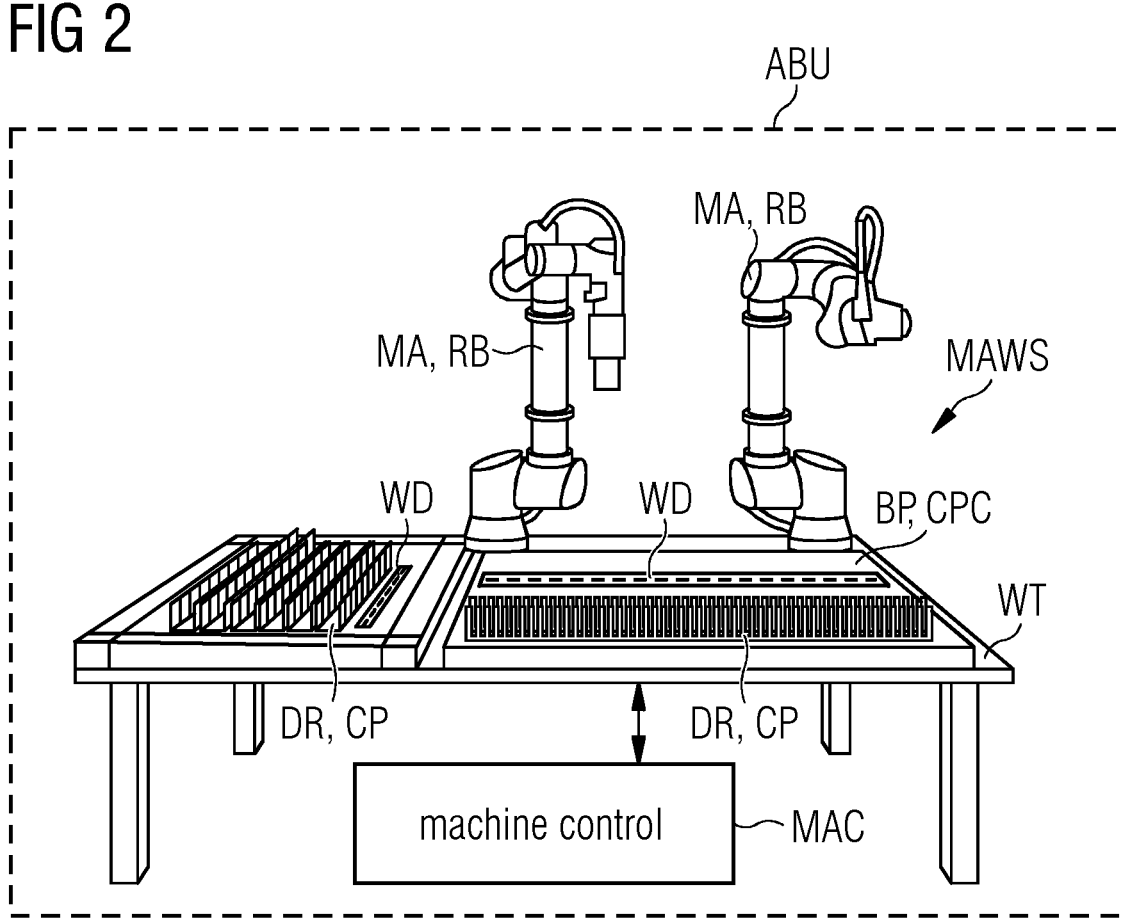
FIG. 2 shows—as a demonstration setup—an assembly unit for automated assembling a non-electric component onto a component-carrier within a workspace.

FIG. 2 shows—as a demonstration setup—an assembly unit ABU for automated assembling a non-electric component CP onto a component-carrier CP within a workspace of the assembly unit ABU. The assembly unit ABU includes for the cited purpose a machine MA, which comprises according to the FIG. 2 two robot arms RB attached to a worktable WT, and a machine control MAC being connected with the machine MA and thereby with regard to the automated assembly of the non-electric component CP onto the component-carrier CP working technically and functionally together with the machine MA. For this reason the workspace is a machine workspace MAWS.

According to the depicted demonstration setup of the assembly unit ABU operating in the machine workspace MAWS to assemble—with regard to the FIG. 1—in an automated manner the DIN-rail DR and/or the wiring duct WD as the non-electric component CP onto the back panel BP as the component-carrier CPC the back panel BP is arranged on a table surface of the worktable WT and in a working distance of the two robot arms RB.

The same is the case with the DIN-rail DR and/or the wiring duct WD to be placed and connected on the back panel BP. Indeed, they are arranged also on the table surface of the worktable WT, but in an operating neighborhood of the back panel BP and in a picking distance of one of the two robot arms RB which is responsible for picking the DIN-rail DR and/or the wiring duct WD to be placed and connected on to the back panel BP.

The FIG. 2 shows further—according to the depicted demonstration setup—that one DIN-rail DR and one wiring duct WD are already placed and connected on the back panel BP. How the DIN-rail DR and the wiring duct WD were mounted on the back panel BP thereby using the depicted the assembly unit ABU including the machine MA in the form of the two robot arms RB and the machine control MAC will be described next according to the FIGS. 3 to 7.

Figure 3:
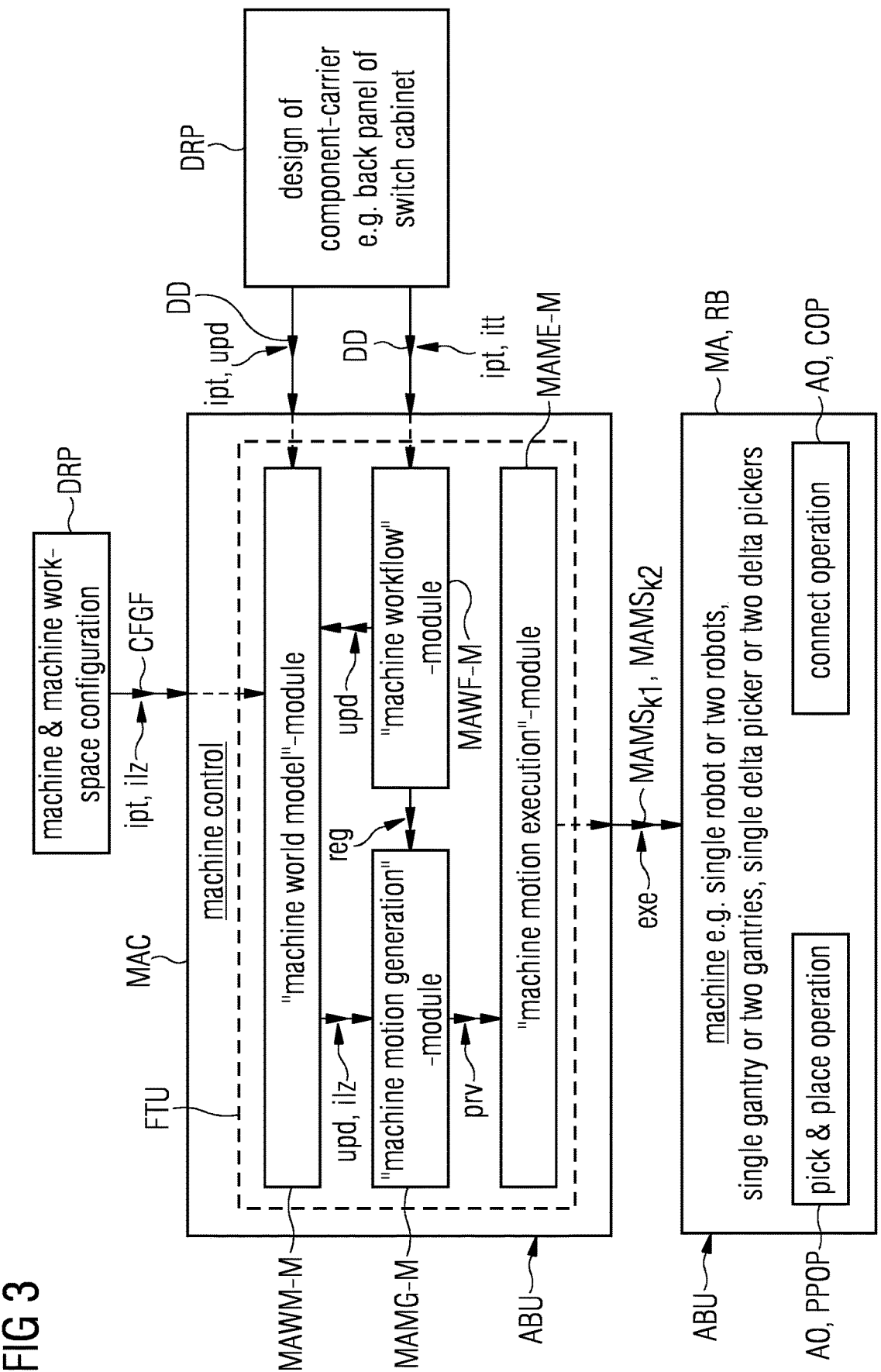
FIG. 3 shows the structure and design of the assembly unit according to the FIG. 2.

FIG. 3 shows structure and design of the assembly unit ABU including the machine MA and the machine control MAC for assembling—as depicted in the FIG. 2—the non-electric component CP, e.g. the DIN-rail DR and/or the wiring duct WD onto the component-carrier CPC, e.g. the back panel BP of the switch cabinet or control cabinet SC.

So the machine MA, which can be designed preferably either as already mentioned as a single robot RB, a single gantry, a single delta picker etc. or alternatively as already mentioned as two robots RB, e.g. the two robot arms according to the FIG. 2, two gantries, two delta pickers etc.

Regardless from the cited design of the machine MA it is essential for the assembly purpose that the machine MA is able to carry out two assembly operations AO, so (i) a pick & place operation PPOP picking the non-electric component CP, DR, WD and placing the picked non-electric component CP, DR, WD onto the component-carrier CPC, BP, SC and (ii) a connect operation COP connecting the placed non-electric component CP, DR, WD with the component-carrier CPC, BP, SC by implementing a connection technology.

This means that in the case of a single robot both operations, the pick & place operation PPOP and the connect operation COP, the single robot must be able to carry out both operations, whereas in the case of two robots or two robot arms as depicted in the FIG. 2 one robot carries out the pick & place operation PPOP and the other the connect operation COP.

And further which connection technology for carrying out the connection operation COP is carried out will be described later on in the context of describing FIGS. 6 and 7.

The machine MA and the machine control MAC of the assembly unit ABU, which work together technically and functionally, form a hybrid, at least reactive and deliberative machine architecture. Such a machine architecture is described for example https://en.wikipedia.org/wiki/Robotic_paradigm according to the version from Aug. 29, 2020 and in https://de.wikipedia.org/wiki/Autonomer_mobiler_Roboter according to the version from Oct. 12, 2020.

According to this machine architecture (i) a "machine world model"-module MAWM-M, being part of the machine control MAC, implements a "machine world model" as a digital twin to formulate correct behavioral sets of the machine MA, so-called machine-behavioral sets, being used during a run-time of the machine MA and (ii) a "machine workflow"-module MAWF-M, being also part of the machine control MAC, implements a workflow of the machine MA, a so-called "machine workflow", by which a piece of machine work to carry out the pick & place operation PPOP and the connect operation COP is passed in series of machine stages from initiation to completion.

The machine control MAC includes further a "machine motion generation"-module MAMG-M and a "machine motion execution"-module MAME-M. The "machine motion generation"-module MAMG-M thereby provides pry a collision-free motion or path planning of the machine MA within the machine workspace MAWS, where according to the FIG. 2 the non-electric component CP, DR, WD is assembled onto the component-carrier CP, BP, SC, to the "machine motion execution"-module MAME-M. Based on this provision the "machine motion execution"-module MAME-M executes exe on the machine MA primary kinematic machine-movement-sequences $MAMS_{k1}$ to enable the pick & place operation PPOP and secondary kinematic machine-movement-sequences $MAMS_{k2}$ to enable the connect operation COP.

Within the machine control MAC of the assembly unit ABE the "machine world model"-module MAWM-M, the "machine workflow"-module MAWF-M, the "machine motion generation"-module MAMG-M and the "machine motion execution"-module MAME-M form a functional unit FTU. Forming this functional unit FTU the "machine world model"-module MAWM-M is updated upd by the "machine workflow"-module MAWF-M and the "machine motion generation"-module MAMG-M is updated upd and initialized ilz on one hand by the "machine world model"-module MAWM-M and is requested on the other by the "machine workflow"-module MAWF-M.

Furthermore the functional unit FTU enables or ensures the execution of the primary kinematic machine-movement-sequences $MAMS_{k1}$ and the secondary kinematic machine-movement-sequences $MAMS_{k2}$ via the machine motion generation in such a way that (a) a configuration file CFGF configuring the machine MA and the machine workspace MAWS is inputted ipt into in the "machine world model"-module MAWM-M and thereby initializing ilz the "machine world model" and
  (b) a design of the component-carrier CPC, BP, SC in form of design data DD is inputted ipt
    (b1) into the "machine workflow"-module MAWF-M thereby instantiating itt the "machine workflow" and
    (b2) into in the "machine world model"-module MAWM-M thereby updating upd the "machine world model".

The configuration file CFGF configuring the machine MA and the machine workspace MAWS as well as the design of the component-carrier CPC, BP, SC in form of the design data DD are taken from a data repository DRP by PUSH- or PULL-based data transfer.

Figure 4:
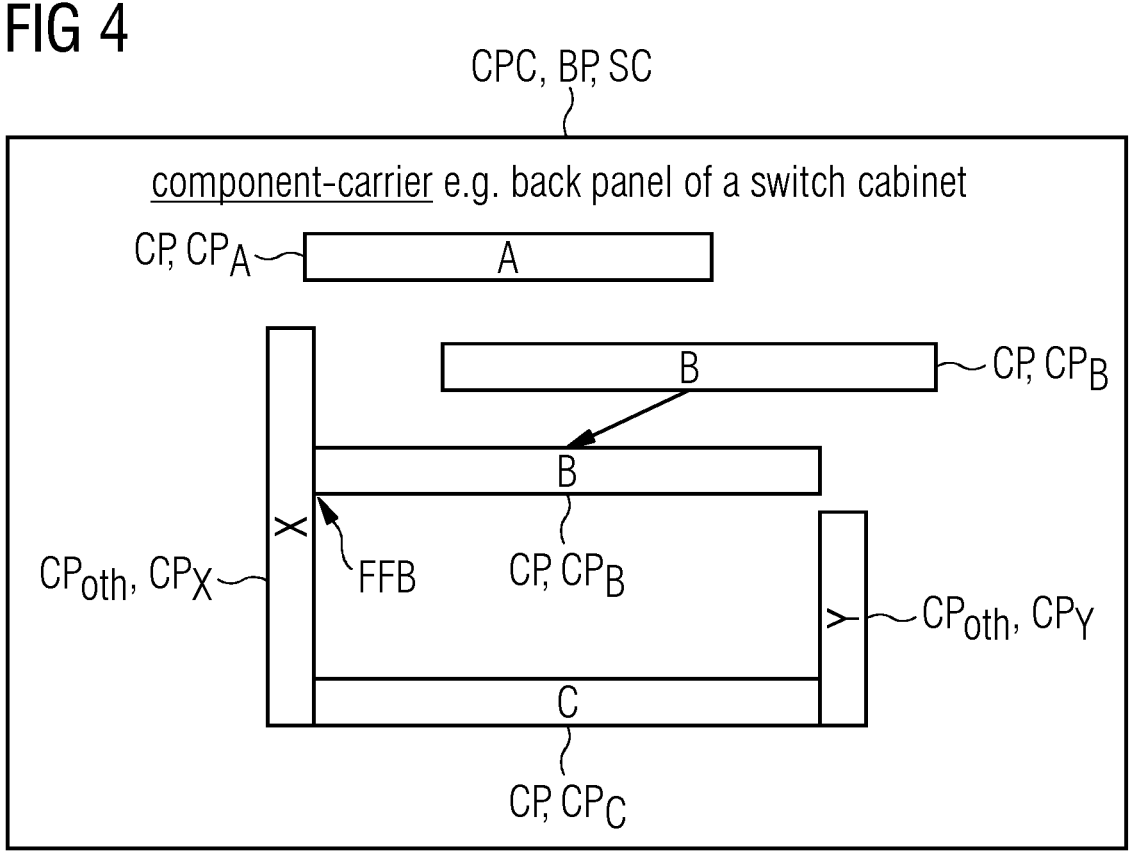
FIG. 4 shows a placement of a picked non-electric component onto a component-carrier with force feedback by the assembly unit depicted in the FIG. 3.

FIG. 4 shows the placement of a picked non-electric component CP, $CP_A$, $CP_B$ onto the component-carrier CPC, BP, SC with a force feedback FFB by the assembly unit ABU, depicted in the FIG. 3, including the machine MA and the machine control MAC with the "machine world model"-module MAWM-M, the "machine workflow"-module MAWF-M, the "machine motion generation"-module MAMG-M and the "machine motion execution"-module MAME-M forming the functional unit FTU and thereby executing the primary kinematic machine-movement-sequences $MAMS_{k1}$ and the secondary kinematic machine-movement-sequences $MAMS_{k2}$.

To place the picked non-electric component CP, $CP_A$, $CP_B$, e.g. the DIN-rail DR and/or the wiring duct WD, onto the component-carrier CPC, BP, SC, e.g. the back panel BP of the switch cabinet or control cabinet SC, the following placing algorithm by the functional unit FTU executing the primary kinematic machine-movement-sequences $MAMS_{k1}$ is used.

If according to a scenario "A" placing a picked non-electric component $CP_A$ there are no other, non-electric components already placed and connected on the component-carrier CPC, BP, SC, which are adjacent to the picked non-electric component $CP_A$, the picked non-electric component $CP_A$ is placed in an orthogonal movement straight down onto the component-carrier CPC, BP, SC until a given force is applied. This force however is not the already mentioned force feedback FFB. This force feedback come into use with regard to a scenario "B" also depicted in the FIG. 4. But also in the scenario "A" the following is applied.

So, the assembly unit ABU including the machine MA and the machine control MAC with the "machine world model"-module MAWM-M, the "machine workflow"-module MAWF-M, the "machine motion generation"-module MAMG-M and the "machine motion execution"-module MAME-M forming the functional unit FTU enable intentional contact between the picked non-electric component $CP_A$ and the component-carrier CPC, BP, SC. This intentional contact is released preferably due to either the machine motion generation by the "machine motion generation"-module MAMG-M or the machine motion generation executing the primary kinematic machine-movement-sequences $MAMS_{k1}$ and the secondary kinematic machine-movement-sequences $MAMS_{k2}$ by the "machine motion generation"-module MAMG-M and the "machine motion execution"-module MAME-M.

However, if according to a scenario "B" placing a picked non-electric component $CP_B$ there are other, non-electric components $CP_{OTH}$—a first other, non-electric components $CP_X$ and second other, non-electric components $CP_Y$,—already placed and connected on the component-carrier CPC, BP, SC, which are adjacent to the picked non-electric component $CP_B$, and if the other, non-electric components $CP_{OTH}$, $CP_X$, $CP_X$ constrain the placing motion, the picked non-electric component $CP_B$ is placed on a free location on the component-carrier CPC, BP, SC and then slit to the right location, against the first other, non-electric component $CP_X$, until the force feedback FFB is applied.

Accordingly, the assembly unit ABU including the machine MA and the machine control MAC with the "machine world model"-module MAWM-M, the "machine workflow"-module MAWF-M, the "machine motion generation"-module MAMG-M and the "machine motion execution"-module MAME-M forming the functional unit FTU execute the primary kinematic machine-movement-sequences $MAMS_{k1}$ such that those sequences of the primary kinematic machine-movement-sequences $MAMS_{k1}$ responsible for placing the picked non-electric component CP, $CP_B$ onto the component-carrier CPC, BP, SC are executed with the force feedback FFB to place the picked non-electric component CP, $CP_B$.

But also in the scenario "B" the intentional contact between the picked non-electric component $CP_B$ and the component-carrier CPC, BP, SC is applied in the same way as stated with respect to the scenario "A".

Figure 5:
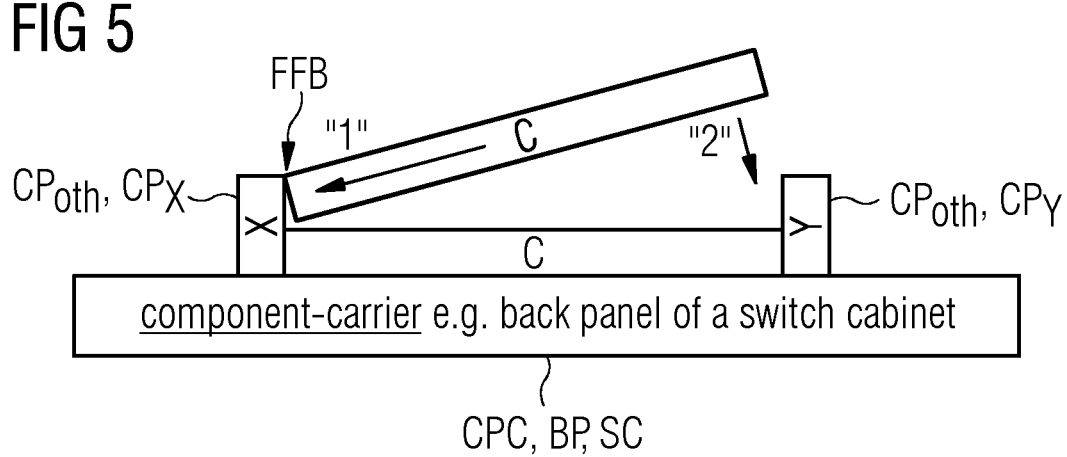
FIG. 5 shows a placement of a picked non-electric component onto a component-carrier with force feedback by the assembly unit depicted in the FIG. 3.

FIG. 5 shows the placement of a picked non-electric component CP, $CP_C$ onto the component-carrier CPC, BP, SC with a force feedback FFB by the assembly unit ABU, depicted in the FIG. 3, including the machine MA and the machine control MAC with the "machine world model"-module MAWM-M, the "machine workflow"-module MAWF-M, the "machine motion generation"-module MAMG-M and the "machine motion execution"-module MAME-M forming the functional unit FTU and thereby executing the primary kinematic machine-movement-sequences $MAMS_{k1}$ and the secondary kinematic machine-movement-sequences $MAMS_{k2}$.

To place the picked non-electric component CP, $CP_C$, e.g. the DIN-rail DR and/or the wiring duct WD, onto the component-carrier CPC, BP, SC, e.g. the back panel BP of the switch cabinet or control cabinet SC, the following placing algorithm by the functional unit FTU executing the primary kinematic machine-movement-sequences $MAMS_{k1}$ is used.

If according to a scenario "C" placing a picked non-electric component $CP_C$ there is a constraint of two other, non-electric components $CP_{OTH}$—a first other, non-electric components $CP_X$ and second other, non-electric components $CP_Y$,—already placed and connected on the component-carrier CPC, BP, SC, which are adjacent to the picked non-electric component $CP_C$, and if the other, non-electric components $CP_{OTH}$, $CP_X$, $CP_Y$ constrain the placing motion, the picked non-electric component $CP_C$ is placed first ("1" in the FIG. 1) down at an angle to the component-carrier CPC, BP, SC against the first other, non-electric component $CP_X$, until the force feedback FFB is applied and then slit towards ("2" in the FIG. 1) the second other, non-electric component $CP_Y$ until the force feedback FFB is applied again and only then the picked non-electric component $CP_C$ is placed down flat on the component-carrier CPC, BP, SC.

Accordingly also here, the assembly unit ABU including the machine MA and the machine control MAC with the "machine world model"-module MAWM-M, the "machine workflow"-module MAWF-M, the "machine motion generation"-module MAMG-M and the "machine motion execution"-module MAME-M forming the functional unit FTU execute the primary kinematic machine-movement-sequences $MAMS_{k1}$ such that those sequences of the primary kinematic machine-movement-sequences $MAMS_{k1}$ responsible for placing the picked non-electric component CP, $CP_C$ onto the component-carrier CPC, BP, SC are executed with the force feedback FFB to place the picked non-electric component CP, $CP_C$.

But also again in the scenario "C" the intentional contact between the picked non-electric component $CP_C$ and the component-carrier CPC, BP, SC is applied in the same way as stated with respect to the scenario's "A" and "B".

Figure 6:
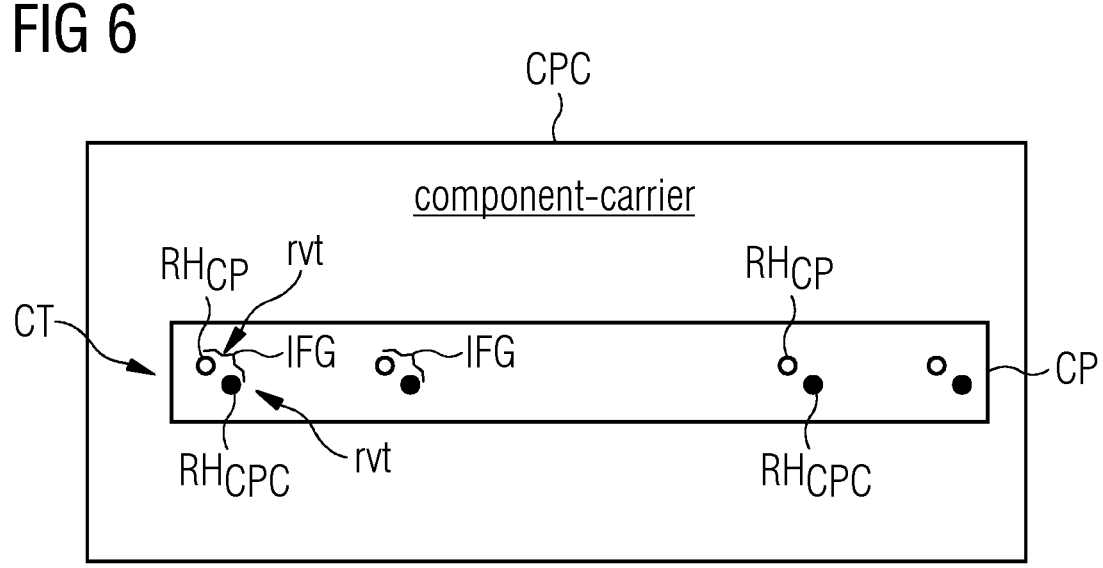
FIG. 6 shows an "µl-fitting"-scenario between a non-electric component, placed onto a component-carrier, and the component-carrier being connected by a connection technology.

FIG. 6 depicts an "µl-fitting"-scenario between a non-electric component CP, placed onto a component-carrier CPC and the component-carrier CPC being connected by a connection technology CT. The connection technology CT being used is based on riveting rvt. Alternatively other connect technologies are possible, although they are not depicted, so for instance screwing.

Thus, to rivet the non-electric component CP onto the component-carrier CPC rivets (cf. FIG. 7) are placed through rivet-holes $RH_{CP}$, preferably pre-drilled, in the non-electric component CP and through corresponding further rivet-holes $RH_{CPC}$, also preferably pre-drilled, in the component-carrier CPC. The locations of these rivet-holes $RH_{CP}$, $RH_{CPC}$ are specified in the design of the component-carrier CPC. Because of tolerances in the non-electric component CP, the component-carrier CPC and/or the placing of the non-electric component CP, the rivet-holes $RH_{CP}$ in the non-electric component CP and the rivet-holes $RH_{CPC}$ in the component-carrier CPC do not always line up as depicted. The result is an ill-fitting IFG.

Figure 7:
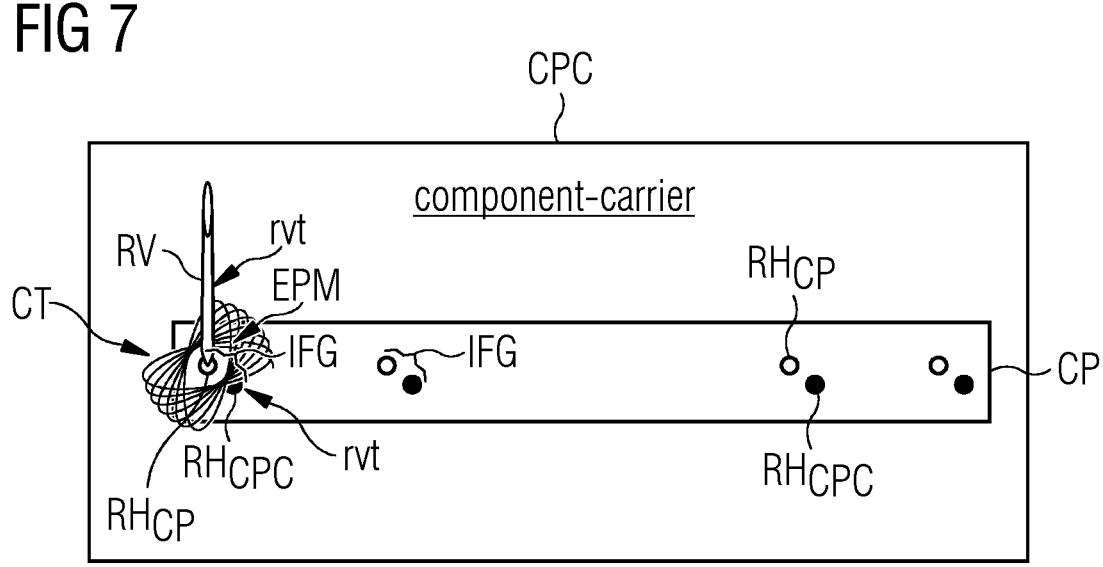
FIG. 7 shows applying an expanding pendulum motion for overcoming an ill-fitting by fitting-finding to implement the connection technology according to FIG. 6.

FIG. 7 depicts an applied expanding pendulum motion EPM for overcoming the ill-fitting IFG shown in the FIG. 6 by fitting-finding to implement the connection technology CT.

To implement the connection technology CT and according to the FIG. 3 the assembly unit ABU including the machine MA and the machine control MAC with the "machine world model"-module MAWM-M, the "machine workflow"-module MAWF-M, the "machine motion generation"-module MAMG-M and the "machine motion execution"-module MAME-M forming the functional unit FTU execute the secondary kinematic machine-movement-sequences $MAMS_{k2}$ such that those sequences of the secondary kinematic machine-movement-sequences $MAMS_{k2}$ responsible for connecting the placed non-electric component CP with the component-carrier CPC, when due to the ill-fitting IFG between the picked and placed non-electric component CP to be connected and the component-carrier CPC the connection technology CT cannot be implemented, are executed with the expanding pendulum motion EPM for a fitting-finding to implement the connection technology CT.

Thus, if the machine MA of the assembly unit ABU, for example a "riveting robot arm" of the pair of robot arms RB according to the FIG. 2, is unable to insert a rivet RV at the specified location, motions are generated that move the rivet RV in an expanding pendulum motion until the rivet RV is placed via the rivet-hole $RH_{CP}$ through the non-electric component CP and via the rivet-hole $RH_{CPC}$ through the component-carrier CPC.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for assembling non-electric components onto a component-carrier, by which the assembling is split into two assembly operations,
 a pick & place operation picking a non-electric component and placing the picked non-electric component onto the component-carrier and
 a connect operation connecting the placed non-electric component with the component-carrier by implementing a connection technology, the method comprising:
 a) executing by machine motion generation including a collision-free motion or path planning of a machine within a machine workspace, wherein the non-electric component is assembled onto the component-carrier,
  a1) primary kinematic machine-movement-sequences to enable the pick & place operation and
  a2) secondary kinematic machine-movement-sequences to enable the connect operation,
 b) providing a hybrid, at least reactive and deliberative machine architecture based on a "machine world model" as a digital twin to formulate correct machine-behavioral sets being used during machine run-time as well as a "machine workflow" according to which a piece of machine work to carry out the pick & place operation and the connect operation is passed in series of machine stages from initiation to completion, to enable or ensure the execution of the primary kinematic machine-movement-sequences and the secondary kinematic machine-movement-sequences via the machine motion generation by
  b1) initializing the "machine world model" according to a configuration file configuring the machine and the machine workspace and
  b2) instantiating the "machine workflow" and updating the "machine world model" with a design of the component-carrier.

2. The method according to claim 1, wherein
 the execution of the primary kinematic machine-movement-sequences and the secondary kinematic machine-movement-sequences is carried out such that
 c) those sequences of the primary kinematic machine-movement-sequences responsible for placing the picked non-electric component onto the component-carrier are executed with force feedback to place the picked non-electric component and/or d) those sequences of the secondary kinematic machine-movement-sequences responsible for connecting the placed non-electric component with the component-carrier are executed with an expanding pendulum motion for a fitting-finding to implement the connection technology when, due to an ill-fitting between the picked and placed non-electric component to be connected and the component-carrier, the connection technology cannot be implemented.

3. The method according to claim 1, wherein intentional contact between the non-electric component and the component-carrier is enabled by the machine motion generation.

4. The method according to claim 1, wherein
the sequences of the primary kinematic machine-movement-sequences responsible for placing the picked non-electric component onto the component-carrier are executed with force feedback, when at least one other non-electric component is already placed on the component-carrier and is adjacent to the picked non-electric component to be placed.

5. The method according to claim 1, wherein
the primary kinematic machine-movement-sequences and the secondary kinematic machine-movement-sequences are executed either on one robot, one gantry, and one delta picker, or on two robots, two gantries, and two delta pickers.

6. The method according to claim 1, wherein
the component-carrier is a back panel of a switch cabinet.

7. The method according to claim 1, wherein
the non-electric component is at least one of a DIN-rail and a wiring duct.

8. The method according to claim 1, wherein
the connection technology is based on riveting or screwing.

9. An assembling unit for assembling non-electric components onto a component-carrier, by which the assembling is split into two assembly operations
a pick & place operation picking a non-electric component and placing the picked non-electric component onto the component-carrier and
a connect operation connecting the placed non-electric component with the component-carrier by implementing a connection technology, the assembling unit comprising:
a machine and a machine control working together technically and functionally are designed such that
a) the machine and the machine control form a hybrid, at least reactive and deliberative machine architecture with a "machine world model"-module of the machine control implementing a "machine world model" as a digital twin to formulate correct machine-behavioral sets being used during machine run-time and a "machine workflow"-module of the machine control implementing a "machine workflow" according to which a piece of machine work to carry out the pick & place operation and the connect operation is passed in series of machine stages from initiation to completion,
b) the machine control includes further a "machine motion generation"-module and a "machine motion execution"-module, wherein the "machine motion generation"-module provides a collision-free motion or path planning of the machine within a machine workspace, wherein the non-electric component is assembled onto the component-carrier, to the "machine motion execution"-module, which executes on the machine b1) primary kinematic machine-movement-sequences to enable the pick & place operation and
b2) secondary kinematic machine-movement-sequences to enable the connect operation
c) the "machine world model"-module, the "machine workflow"-module, the "machine motion generation"-module and the "machine motion execution"-module form within the machine control a functional unit such that, when
a configuration file configuring the machine and the machine workspace is inputted into in the "machine world model"-module of the machine control thereby initializing the "machine world model" and
a design of the component-carrier in form of design data is inputted into the "machine workflow"-module of the machine control thereby instantiating the "machine workflow" and is inputted into in the "machine world model"-module thereby updating the "machine world model",
execution of the primary kinematic machine-movement-sequences and the secondary kinematic machine-movement-sequences via the "machine motion generation"-module is enabled or ensured.

10. The assembling unit according to claim 9, wherein
the machine and the machine control with the "machine world model"-module, the "machine workflow"-module, the "machine motion generation"-module and the "machine motion execution"-module forming the functional unit are designed and carried out the execution of the primary kinematic machine-movement-sequences and the secondary kinematic machine-movement-sequences such that
d) those sequences of the primary kinematic machine-movement-sequences responsible for placing the picked non-electric component onto the component-carrier are executed with force feedback to place the picked non-electric component,
e) those sequences of the secondary kinematic machine-movement-sequences responsible for connecting the placed non-electric component with the component-carrier, when due to an ill-fitting between the picked and placed non-electric component to be connected and the component-carrier the connection technology cannot be implemented, are executed with an expanding pendulum motion for a fitting-finding to implement the connection technology.

11. The assembling unit according to claim 9, wherein,
the machine and the machine control with the "machine world model"-module, the "machine workflow"-module, the "machine motion generation"-module and the "machine motion execution"-module forming the functional unit are designed such that intentional contact between the non-electric component and the component-carrier is enabled, in particular due to either the machine motion generation by the "machine motion generation"-module or the machine motion generation executing the primary kinematic machine-movement-sequences and the secondary kinematic machine-movement-sequences by the "machine motion generation"-module and the "machine motion execution"-module.

12. The assembling unit according to claim 9, wherein
the machine and the machine control with the "machine world model"-module, the "machine workflow"-module, the "machine motion generation"-module and the "machine motion execution"-module forming the functional unit are designed such that the sequences of the primary kinematic machine-movement-sequences responsible for placing the picked non-electric component onto the component-carrier are executed with force feedback, when at least one other non-electric component is already placed on the component-carrier and is adjacent to the picked non-electric component to be placed.

13. The assembling unit according to claim 9, wherein the machine, on which the primary kinematic machine-movement-sequences and the secondary kinematic machine-movement-sequences are executed, is a single robot, a single gantry, and a single delta picker, etc. or includes two robots, two gantries, and two delta pickers.

14. The assembling unit according to claim 9, wherein the component-carrier is a back panel of a switch cabinet.

15. The assembling unit according to claim 9, wherein the non-electric component is at least one of a DIN-rail and a wiring duct.

16. The assembling unit according to claim 9, wherein the connection technology is based on riveting or screwing.

17. A method for assembling non-electric components onto a component-carrier, wherein the assembling is split into two assembly operations, a pick & place operation picking a non-electric component and placing the picked non-electric component onto the component-carrier and a connect operation connecting the placed non-electric component with the component-carrier by implementing a connection technology, the method comprising:
   a) executing by machine motion generation including a collision-free motion or path planning of a machine within a machine workspace, wherein the non-electric component is assembled onto the component-carrier,
   a1) primary kinematic machine-movement-sequences to enable the pick & place operation and
   a2) secondary kinematic machine-movement-sequences to enable the connect operation,
   b) providing a hybrid, at least reactive and deliberative machine architecture based on a "machine world model" as a digital twin to formulate correct machine-behavioral sets being used during machine run-time as well as a "machine workflow" according to which a piece of machine work to carry out the pick & place operation and the connect operation is passed in series of machine stages from initiation to completion, to enable or ensure the execution of the primary kinematic machine-movement-sequences and the secondary kinematic machine-movement-sequences via the machine motion generation by
   b1) initializing the "machine world model" according to a configuration file configuring the machine and the machine workspace and
   b2) instantiating the "machine workflow" and updating the "machine world model" with a design of the component-carrier,
   wherein the method further includes
      executing sequences of the primary kinematic machine-movement-sequences responsible for placing the picked non-electric component onto the component-carrier with force feedback when at least one other non-electric component is already placed on the component-carrier and is adjacent to the picked non-electric component to be placed, and/or executing sequences of the secondary kinematic machine-movement-sequences responsible for connecting the placed non-electric component with the component-carrier with an expanding pendulum motion for a fitting-finding to implement the connection technology when, due to an ill-fitting between the picked and placed non-electric component to be connected and the component-carrier, the connection technology cannot be implemented.

18. The method according to claim 17, wherein the execution of the primary kinematic machine-movement-sequences and the secondary kinematic machine-movement-sequences is carried out such that
   c) those sequences of the primary kinematic machine-movement-sequences responsible for placing the picked non-electric component onto the component-carrier are executed with force feedback to place the picked non-electric component.

19. The method according to claim 17, wherein intentional contact between the non-electric component and the component-carrier is enabled by the machine motion generation.

20. The method according to claim 17, wherein the component-carrier is a back panel of a switch cabinet, wherein the non-electric component is at least one of a DIN-rail and a wiring duct, and/or wherein the connection technology is based on riveting or screwing.

* * * * *